United States Patent Office 2,926,195
Patented Feb. 23, 1960

---

2,926,195

METHOD OF MAKING A VINYLPHENYL BOROXOLE

Stephen J. Groszos, Darien, and Arthur K. Hoffmann, Stamford, Conn., assignors to American Cyanamid Company, New York, N.Y., a corporation of Maine No Drawing. Application September 6, 1957
Serial No. 682,314

5 Claims. (Cl. 260—606.5)

This invention relates to a method of making a substituted boroxole, and more particularly is concerned with a method of making a vinylphenyl boroxole. Still more particularly the invention relates to the method of making a vinylphenyl boroxole which comprises dehydrating the corresponding vinylphenyl boronic acid until water no longer is evolved.

The vinylphenyl boroxoles produced by the method of this invention may be represented by the following general formula:

(I)
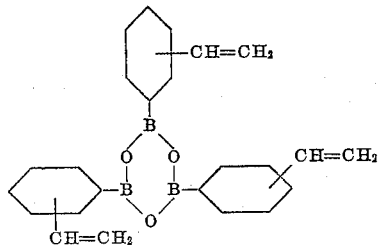

Compounds embraced by Formula I include o-, m- and p-vinylphenyl boroxoles, and the term "a vinylphenyl boroxole" as used generically herein and in the appended claims includes both the pure or substantially pure isomers of vinylphenyl boroxole, as well as any two or all three of the aforementioned isomers in any proportions.

The vinylphenyl boronic acids which are dehydrated to produce the vinylphenyl boroxoles in accordance with the present invention may be represented by the following general formula:

(II)
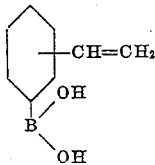

Compounds embraced by Formula II include o-, m- and p-vinylphenyl boronic acids, and the term "a vinylphenyl boronic acid" as used generically herein and in the appended claims includes both the pure or substantially pure individual isomers of vinylphenyl boronic acid, as well as any two or all three of the aforementioned isomers in any proportions.

The vinylphenyl boroxoles and the vinylphenyl boronic acids are believed to be new chemical compounds, and are claimed per se in the copending application of Arthur K. Hoffmann, Stephen J. Groszos and Walter M. Thomas, Serial No. 682,312 filed concurrently herewith, and wherein is disclosed under Example 25 the preparation of a glyceryl vinylphenyl boronate, specifically glyceryl p-vinylphenyl boronate, by reaction between p-vinylphenyl boroxole and glycerol. In this application Serial No. 682,312 reference also is made to Hoffmann and Thomas copending application Serial No. 682,315 directed to the production of homopolymers and copolymers of a vinylphenyl boroxole and filed concurrently with the present application. In this last-identified copending application cross-reference is made to the instant application, and numerous examples are given of the production of homopolymers and copolymers of a vinylphenyl boroxole and of uses of the said homopolymers and copolymers. In the said copending application Serial No. 682,312 there is additionally disclosed the method of making a vinylphenyl boroxole which comprises dehydrohalogenating, under anhydrous conditions and while admixed with a base, the corresponding alpha-X-ethylphenyl boroxole, where X represents chlorine or bromine. This method is claimed in our copending application Serial No. 834,643, filed August 19, 1959, as a division of the aforesaid copending application Serial No. 682,312. In copending application Serial No. 682,-312 there is also disclosed the method of preparing a vinylphenyl boronoic acid which comprises hydrating the corresponding vinylphenyl boroxole.

The present invention relates to a simple and economical method of making a vinylphenyl boroxole which is entirely different from that which is disclosed in the aforementioned copending application Serial No. 682,312 and which is both disclosed and claimed in the aforementioned, copending, divisional application Serial No. 834,643.

In the preferred method of practicing the present invention, a vinylphenyl boroxole is made by heating a fluid mass comprising the corresponding vinylphenyl boronic acid, e.g., p-vinylphenyl boronic acid contained (more particularly dissolved or dispersed) in an organic liquid medium, i.e., an organic solvent or diluent, in which it is inert (substantially completely inert) until water no longer is evolved; and thereafter isolating the resulting vinylphenyl boroxole from the reaction mass. The starting vinylphenyl boronic acid ordinarily is almost (if not completely) insoluble in the organic solvent (or diluent) employed, but the dehydration product (i.e., the corresponding vinylphenyl boroxole) ordinarily is soluble therein. Hence the desired product is isolated or recovered in high yields (generally above 95% of the theoretical) merely by evaporation of the inert, organic, liquid medium in which the dehydration was effected.

By "fluid mass," as used herein and in the appended claims, it is meant that the mass comprising the vinylphenyl boronic acid is in the fluid state at the dehydration temperature employed; and by "liquid medium," that the solvent or diluent in which the vinylphenyl boronic acid is dissolved or dispersed is in the liquid state at the temperature of dehydration. In other words, the "fluid mass" may or may not be in the fluid state, and the "liquid medium" may or may not be in the liqiud state, at room temperature or at any other temperature below the temperature to which the mass is heated in order to effect dehydration of the said boronic acid. By "inert" or "substantially completely inert," as used herein and in the appended claims with reference to the organic liquid medium, is meant one which is so inert or non-reactive toward the vinylphenyl boronic acid and the dehydration product thereof, i.e., the vinylphenyl boroxole, that it will not affect the dehydration of the vinylphenyl boronic acid or the constitution of the vinylphenyl boroxole. Preferably the organic liquid medium is one which is volatile (volatilizable) without decomposition and boils at a temperature, or over a temperature range, of from about 75° C. to about 145° C.

Illustrative examples of inert, organic, liquid media in which the dehydration of the vinylphenyl boronic acid advantageously can be effected (in addition to the previously-mentioned toluene) are: benzene, o-, m- and p-xylenes, carbon tetrachloride, o-, m- and p-fluorotoluene, benzotrifluoride, ethylene dichloride, fluorobenzene, 1,2-dipropoxybenzene, propionitrile, alpha,alpha-dimethylpropionitrile, n-butyl chloride, n-butyl bromide, and others that will be apparent to those skilled in the art from the foregoing examples.

The vinylphenyl boroxoles also can be produced merely by heating a vinylphenyl boronic acid at temperatures up to and at or above 100° C., in the absence of an inert, organic liquid medium, until water no longer is evolved.

PREPARATION OF A VINYLPHENYL BORONIC ACID

A vinylphenyl boronic acid, which is dehydrated to yield a vinylphenyl boroxole in practicing the present invention, can be prepared by, for example, the method described below with particular reference to the preparation of p-vinylphenyl boronic acid.

A. Preparation of intermediates used in making p-α-bromoethylphenyl boroxole (a) P-ETHYLBROMOBENZENE To two kg. (18.85 moles) of ethylbenzene contained in a 5-liter, 3-necked, round-bottom flask equipped with a stirrer, addition funnel, reflux condenser and hydrogen-bromide trap, are added 100 g. of iodine and 3 g. of steel wool. Following solution of the iodine, 3,083 g. (19.25 moles) of bromine are added at a rate such that the temperature of the reaction mixture does not exceed 60° C. After hydrogen-bromide evolution has ceased following completion of the bromine addition, the reaction mass is washed with excess 10% aqueous sodium hydroxide solution, and then with 10% aqueous sodium thiosulfate solution until colorless. After drying over solid sodium hydroxide, the product is distilled to obtain 3,306 g. (92% of the theoretical yield), B.P., 196°-215° C. The mixture of isomeric bromides is then fractionally distilled to separate the o- and p-isomers; pure para isomer, $n_D^{25}$ 1.5425.

(b) P-ETHYLPHENYLBORONIC ACID p-Ethylbromobenzene, 555 g. (3.0 moles), is added dropwise to 73 g. (3.15 moles) Mg in 1 liter of anhydrous ether (diethyl ether). After completion of the reaction, the ether solution of p-ethylphenylmagnesium bromide is added dropwise under nitrogen pressure to a solution of 913 g. (3.98 moles) of n-butyl borate (tri-n-butyl borate) in 800 ml. of anhydrous ether cooled to −70° C. in a Dry Ice-acetone bath. After the addition of the Grignard solution has been completed, the reaction mixture is allowed to warm slowly to room temperature. The reaction mass is allowed to remain at ambient temperature for 12 hours before decomposition.

The reaction mass is decomposed by the addition of 1 liter of 10% aqueous sulfuric acid. The ether layer is separated, and evaporated on a water bath. Following the removal of ether, the butanol-water system is made alkaline with aqueous sodium hydroxide solution, and the butanol is removed by distillation in vacuo. Water is added from time to time to maintain a volume of about 3 liters. When the butanol has been removed, the aqueous solution is acidified with hydrochloric acid, and the resultant precipitate of p-ethylphenylboronic acid is filtered off, and recrystallized once from hot water. Yield: 378 g., 84% of the theoretical yield; M.P. 149°-150° C.

(c) P-ETHYLPHENYLBOROXOLE p-Ethylphenylboronic acid, 284 g. (1.9 moles), is refluxed in 1 liter of toluene in a flask fitted with a Dean and Stark trap to remove water. When water no longer appears in the condensate, the toluene is removed by vacuum evaporation to yield crystalline p-ethylphenylboroxole, M.P. 194°-195° C.

B. Preparation of p-α-bromoethylphenylboroxole p-Ethylphenylboroxole, 147 g. (0.372 mole), is dissolved in 3.25 liters of anhydrous carbon tetrachloride. N-bromosuccinimide, 200 g. (1.125 moles), is added and the reaction mixture is heated to reflux. A free-radical catalyst, specifically benzoyl peroxide, 1.0 g., is then added to initiate the reaction. In the absence of such a catalyst more than 8 hours is required before reaction begins, while in the presence of an initiating or catalytic amount of benzoyl peroxide bromination is complete in amout 3 hours. After completion of the reaction the by-product succinimide, which is insoluble in carbon tetrachloride, is removed by filtration, washed with small portions of carbon tetrachloride and the solvent removed from the filtrate by evaporating it on a water bath. Cooling the residue results in the formation of a pale-tan, crystalline mass of crude p-α-bromoethylphenyl boroxole which, on recrystallization from 1:1 benzene-cyclohexane (by volume), yields 212 g. (90% of theory) of cream-colored product. An additional recrystallization provides a white product, M.P. 183.5°-184° C.

Analysis.—Calcd. for $C_{24}H_{24}O_3Br_3B_3$: C, 45.56; H, 3.82; Br. 37.90; B, 5.13. Found: C, 45.51; H, 3.97; Br, 38.16; B, 5.09.

C. Preparation of p-vinylphenyl boronic acid p-α-Bromoethylphenyl boroxole 10 g. (0.0155 mole), is placed in a 150 ml. Erlenmeyer flask to which 20 g. of freshly distilled quinoline is added. The reaction mixture is heated at 130°-140° C. for one-half hour with occasional stirring. During the reaction the flask is protected by a calcium sulfate drying tube. At the end of the reaction time, the flask is cooled and the contents poured into 200 ml. of water. The reaction mass is acidified with aqueous hydrochloric acid and extracted with ether (diethyl ether). The ether is evaporated on the water bath and the residual, light-orange solid is recrystallized from hot water in the presence of a small amount of charcoal. The yield of colorless p-vinylphenyl boronic acid is 5.3 g. (74% of theory).

The o- and m-vinylphenyl boronic acids are prepared from the corresponding o- and m-alpha-bromoethylphenyl boroxoles in essentially the same manner described above with reference to the preparation of p-vinylphenyl boronic acid from p-alpha-bromoethylphenyl boroxole.

In order that those skilled in the art better may understand how the present invention can be carried into effect, the following examples are given by way of illustration and not by way of limitation. All parts and percentages are by weight unless otherwise stated.

*Example 1.*—p-Vinylphenyl boronic acid, 10 g. (0.068 mole), is refluxed in 200 ml. of toluene till water is no longer evolved, using a flask fitted with a Dean and Stark trap to remove the water. Evaporation of the toluene to a volume of 20 ml., leads to the deposition of 8.4 g. of pale tan crystals of p-vinylphenyl boroxole. Yield, 97% of theory. Two recrystallizations of a small sample of the product from toluene afforded colorless needles, M.P., 195°-196° C.

Analysis.—Calcd. for C, 73.93; H, 5.43; B, 8.33. Found: C, 73.94; H, 5.45; B, 8.54.

*Example 2.*—Example 1 is repeated using 200 ml. of benzene instead of 200 ml. of toluene, and continuing to reflux the dispersion of the p-vinylphenyl boronic acid in the benzene until water no longer is evolved. The yield of crude crystals of p-vinylphenyl boroxole is more than 95% of the theoretical.

*Example 3.*—The same procedure is followed as described under Example 1 with the exception that 10 g. of o-vinylphenyl boronic acid is used instead of 10 g. of the para isomer. The yield of crystalline o-vinylphenyl boroxole is approximately 97% of the theoretical.

*Example 4.*—p-Vinylphenyl boronic acid, 10 g. (0.068 mole), is heated in vacuo to 150° C. in an oil bath for 3 hours. At the end of this time, the evacuated vessel is cooled and dry air admitted. The yield of crude, pale yellow p-vinylphenyl boroxole is quantitative, and two recrystallizations from toluene afford colorless, crystalline product.

*Example 5.*—Example 3 is repeated using 250 ml. of o-xylene instead of 200 ml. of toluene. The dispersion of o-vinylphenyl boronic acid in o-xylene is refluxed till water no longer appears in the condensate. The o-xylene is then removed by vacuum evaporation. Crude, pale yellow o-vinylphenyl boroxole is obtained in a yield of approximately 95% of theory.

*Example 6.*—Example 1 is repeated using 300 ml. of propionitrile instead of 200 ml. of toluene. The solution of p-vinylphenyl boronic acid is slowly distilled till the volume of distillate is 50 ml. The remainder of the solvent is removed by vacuum evaporation. The yield of crude p-vinylphenyl boroxole is about 98% of theory.

p-α-Bromoethylphenyl boroxole is believed to be a new chemical compound and is broadly and specifically claimed per se, as well as a method of making it, in the copending application of one of us (Arthur K. Hoffmann), Serial No. 682,313, filed concurrently herewith, and now Patent No. 2,868,840, dated January 13, 1959.

We claim:

1. The method of making a vinylphenyl boroxole which comprises heating a fluid mass comprising the corresponding vinylphenyl boronic acid contained in an organic liquid medium in which it is inert until water no longer is evolved, said organic liquid medium boiling within the range of from about 75° C. to about 145° C.; and isolating the resulting vinylphenyl boroxole from the reaction mass.

2. The method of making p-vinylphenyl boroxole which comprises heating a fluid mass comprising p-vinylphenyl boronic acid contained in an organic liquid medium in which it is inert until water no longer is evolved, said organic liquid medium boiling within the range of from about 75° C. to about 145° C.; and isolating the resulting p-vinylphenyl boroxole from the reaction mass.

3. A method as in claim 2 wherein the organic medium is toluene.

4. The method of making a vinylphenyl boroxole which comprises heating a fluid mass comprising the corresponding vinylphenyl boronic acid contained in an organic liquid medium in which it is inert until water no longer is evolved, said organic liquid medium boiling within the range of from about 75° C. to about 145° C. and additionally characterized by being one in which the starting vinylphenyl boronic acid is almost if not completely insoluble while the vinylphenyl boroxole obtained by dehydration of the said boronic acid is soluble therein; and isolating the resulting vinylphenyl boroxole from the reaction mass.

5. The method of making p-vinylphenyl boroxole which comprises heating a fluid mass comprising the corresponding p-vinylphenyl boronic acid contained in an organic liquid medium in which it is inert until water no longer is evolved, said organic liquid medium boiling within the range of from about 75° C. to about 145° C. and additionally characterized by being one in which the starting p-vinylphenyl boronic acid is almost if not completely insoluble while the p-vinylphenyl boroxole obtained by dehydration of the said boronic acid is soluble therein; and isolating the resulting p-vinylphenyl boroxole from the reaction mass.

References Cited in the file of this patent

Michaelis et al.: Ber., vol. 15, pp. 180–185, (1882).
Torssel: Acta Chem. Scand., vol. 8, part 2, pp. 1779 to 1786.
Konig et al.: Journal Fur Prakt. Chem., vol. 128, pp. 153 to 168.
Fieser et al.: "Organic Chemistry," 2nd ed., D. C. Heath & Co., 1950, pp. 970–1.
Lappert: Chem. Reviews, vol. 56, pp. 1004 and 1061, (1956).